March 26, 1968  E. G. LOWE  3,375,479
CONTINUOUS TURNING SLIP RING ASSEMBLY

Filed Nov. 2, 1965  3 Sheets-Sheet 1

INVENTOR.
ESTEL G. LOWE
BY  G. † McCoy
Wayland H. Riggins
ATTORNEYS

March 26, 1968   E. G. LOWE   3,375,479
CONTINUOUS TURNING SLIP RING ASSEMBLY
Filed Nov. 2, 1965   3 Sheets-Sheet 2

INVENTOR.
ESTEL G. LOWE
BY
ATTORNEYS

March 26, 1968 — E. G. LOWE — 3,375,479
CONTINUOUS TURNING SLIP RING ASSEMBLY
Filed Nov. 2, 1965 — 3 Sheets-Sheet 3

INVENTOR.
ESTEL G. LOWE
BY
ATTORNEYS 3,375,479
CONTINUOUS TURNING SLIP RING ASSEMBLY
Estel G. Lowe, 7803 Milton St.,
Huntsville, Ala. 35802
Filed Nov. 2, 1965, Ser. No. 506,137
8 Claims. (Cl. 339—5)

ABSTRACT OF THE DISCLOSURE

The invention relates to a slip ring assembly having inner and outer peripheral surfaces which serve as electrical contacts for brushes. One set of brushes is located between a central normally stationary part and the slip rings so that the brushes engage the inner surface of the slip rings. The other set of brushes is located between an oscillating part and the slip rings so that the brushes engage the outer surface of the latter.

---

The invention described herein may be manufactured and used by or for the Government of the United States of America for governmental purposes without the payment of any royalties thereon or therefor.

The present invention relates generally to a slip ring assembly and more particularly to a novel arrangement for imparting a continuous rotation to a part of the slip ring assembly independently of the rotational action which normally takes place between the electrical input and output elements of the assembly.

This invention has an advantageous application to any type of equipment which requires the transmission of electrical energy or information between independently mounted components whose relative motion may be a rocking or oscillating rotation of small angular amplitude about a relatively unvarying median position with only infrequent full circle or large angular movements. This type of equipment is presently being used in the guidance and control systems for rockets, missiles and other space vehicles, and is considered to be essential to the successful operation thereof.

The conventional type of slip ring assembly employs feelers or brushes which rub against the peripheral surfaces of the slip rings. These prior art slip rings have been used widely in rotating machinery for many years and, in general, have rendered satisfactory service and long life when applied to the type of equipment which imparts a continuous rotation of the slip rings relative to the brushes or vice versa. In such an application, this continuous rotation causes the wear on the slip rings to be spread evenly over the entire contact surfaces thereof and results in a self-cleaning action for the contact surfaces.

Although these prior-art slip ring assemblies are capable of rendering satisfactory service and long life when applied to the continuous rotating type of machinery, they have not been found to be adequate or suitable when used with the type of equipment which has a limited arc oscillating or rocking motion with only an infrequent excursion to a full 360° revolution. When used in conjunction with the latter type of equipment, the brushes in the slip ring assembly constantly scrub on short sections of the contact surfaces of the slip rings and thereby cause the contact surfaces to wear down only in those short sections. The remaining sections of the contact surfaces of the slip rings are subjected to so little scrubbing that insulating deposits form thereon due to the outgassing of organic materials. Also, surface oxidation and corrosion set in. Consequently, when the equipment has to be rotated through a full 360° revolution or more, the brushes in the slip ring assembly tend to lose contact at these worn-down sections in the contact surfaces of the slip rings and also provide erratic contact over the remaining sections of the contact surfaces due to the contact-resistance effects of the insulating deposits, oxidation and corrosion. This erratic contact action presents a very serious problem in the slip ring assemblies which transmit signal information in the guidance and control systems of missiles and space vehicles for it introduces high electrical noise which has a detrimental effect on the signals being transmitted. On frequent occasions, this electrical noise has become so great that the entire slip ring assembly had to be replaced after a very short service life.

The difference in the slip ring performance and life in these two types of applications is due to the overall wear and scrubbing the slip rings receive in the continuously rotating machinery as contrasted to the excessive localized scrubbing and wear received only on small sections of the slip rings when the slip ring assembly is used in conjunction with the oscillating or rocking type of equipment. Thus arose the novel theory that if a continuous rotating action could be imparted to the slip rings when the slip ring assembly is used with the oscillating or rocking type of equipment, the slip rings would receive a continuous overall scrubbing and therefore give a performance and service life comparable to that which has been experienced with the slip ring assemblies used with the continuously rotating machinery. This theory underlies the concept of the present invention; mainly, to incorporate a continuous turning or rotating movement to the basic slip rings in order to obtain the overall non-localized cleaning action which is essential for a long and useful service life of the slip ring assembly.

In accordance with the present invention, it has been found that the concept discussed above for overcoming the difficulties and disadvantages presented by the prior-art slip ring assemblies may be accomplished by providing a novel slip ring assembly which has one set of continuously rotating slip rings and two sets of brushes which are movable in relation to each other as well as to the slip rings.

The slip rings have inner and outer peripheral surfaces which serve as electrical contacts for the brushes. One set of brushes is located between the normally stationary part of the rotating equipment and the slip rings so that the brushes engage the inner peripheral surfaces of the slip rings. The other set of brushes is located between the oscillating or rocking part of the rotating equipment and the slip rings so that the brushes engage the outer peripheral surfaces of the latter. This arrangement of the brushes allows each set of brushes to traverse the full peripheries of the slip rings without interfering with each other. The slip rings are continuously rotated by having them mounted on a ring capsule which is driven by a separate power source and gear train. With the power source continuously rotating the slip rings, the wear caused by the brushes is assured of being spread evenly over the entire inner and outer peripheral surfaces of the slip rings instead of being concentrated in relatively small sections thereof. As a result of this arrangement, a continuous electrical contact is maintained between each brush and slip ring and no worn, insulated or corroded spots can occur anywhere on the contact surfaces of the slip ring to cause a noise spike in the electrical signals being transmitted therethrough.

Accordingly, it is an object of the present invention to provide a slip ring assembly which minimizes electrical noises normally generated in transmitting signal information therethrough.

It is also an object of this invention to provide a slip ring assembly that eliminates localized wear on the slip rings.

Another object of this invention is to provide a slip ring assembly which imparts a constant cleaning action over the entire surfaces of the slip rings to forestall the formation of insulating deposits, oxidation and corrosion effects.

A further object of the present invention is to provide a slip ring assembly which has a long service life and is economical to manufacture and maintain.

Other objects and advantages of the present invention will become more apparent from a reading of the following detailed description and appended claims taken in conjunction with the accompanying drawings wherein:

Figure 1:
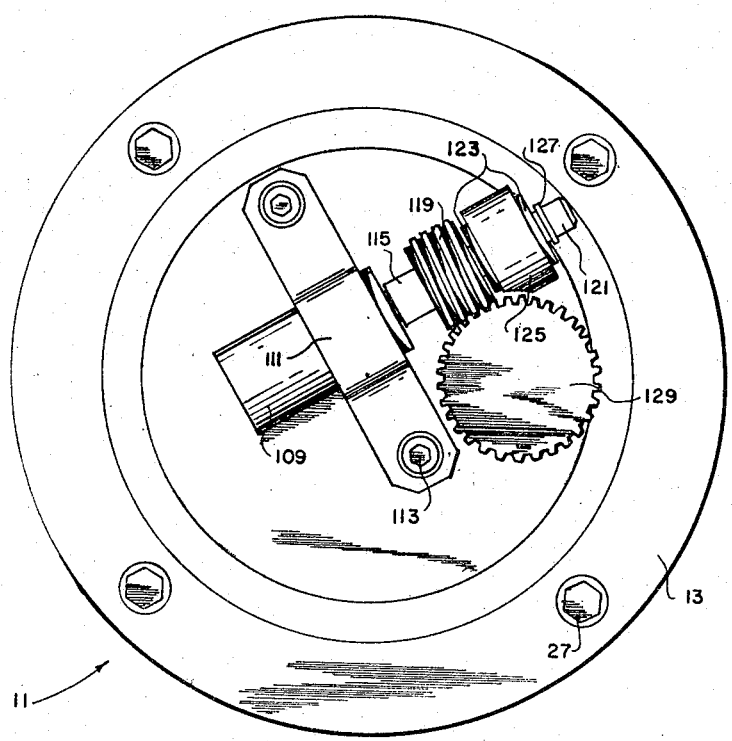
FIGURE 1 is a plan view of a slip ring assembly.
Figure 2:
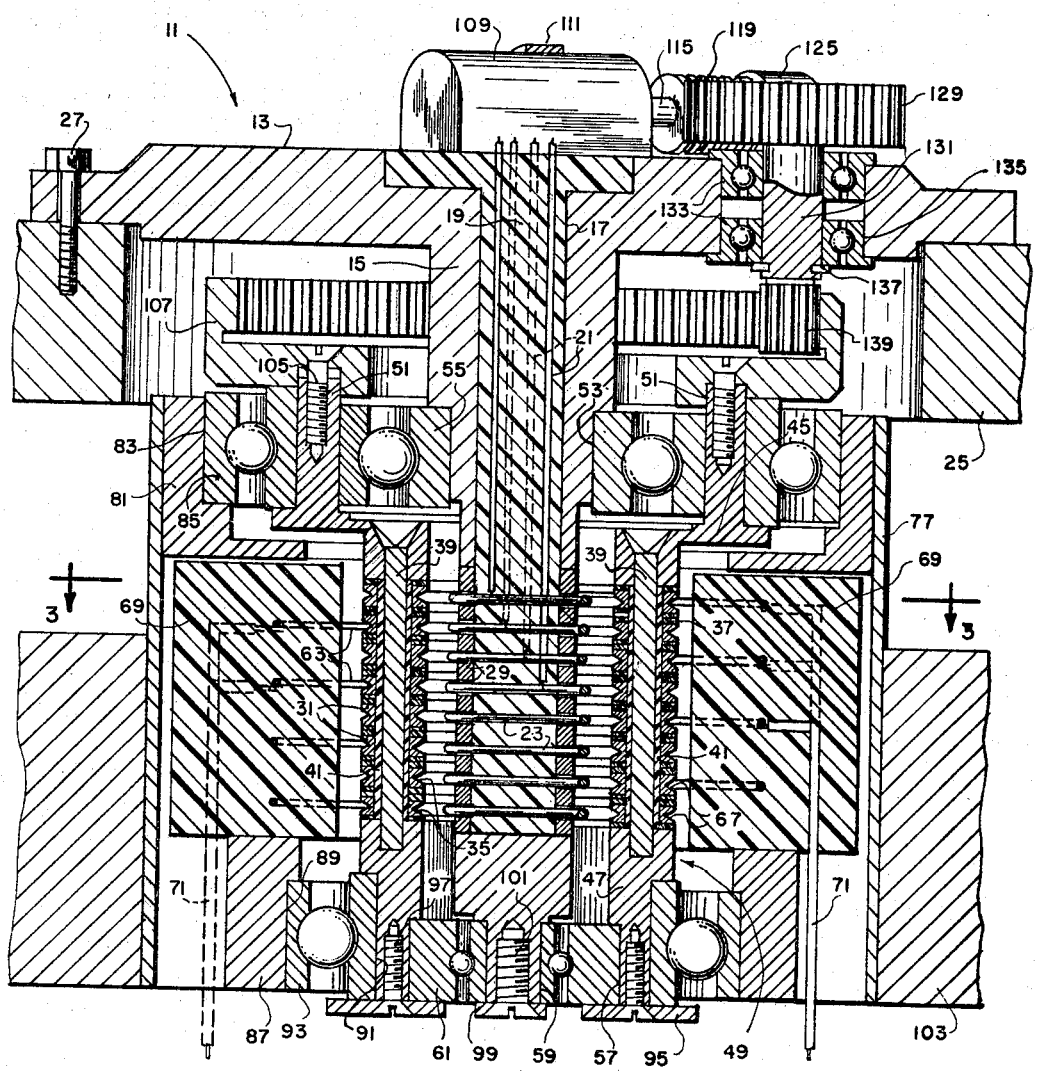
FIGURE 2 is a sectional elevational view of the slip ring assembly of FIGURE 1, and, FIGURE 3 is a cross sectional view taken along line 3—3 of FIGURE 2.

Referring now in more detail to the drawings wherein like reference numerals designate identical or corresponding parts throughout the several views, and with special attention to FIGURES 1 and 2, reference numeral 11 generally designates a slip ring assembly which constitutes one form of the present invention. At the upper end of the assembly 11 is a cover plate 13 having an integral spindle portion 15 which extends axially through the assembly. Throughout most of its length the spindle 15 has a central bore 17 filled with insulating material 19. Encased in the insulating material 19 are input lead wires 21 and transversely extending inner feelers or brushes 23, the lead wires being connected to the respective feelers within the insulating material 19. The plate 13 is shown anchored to a support member 25 by screws 27.

Figure 3:
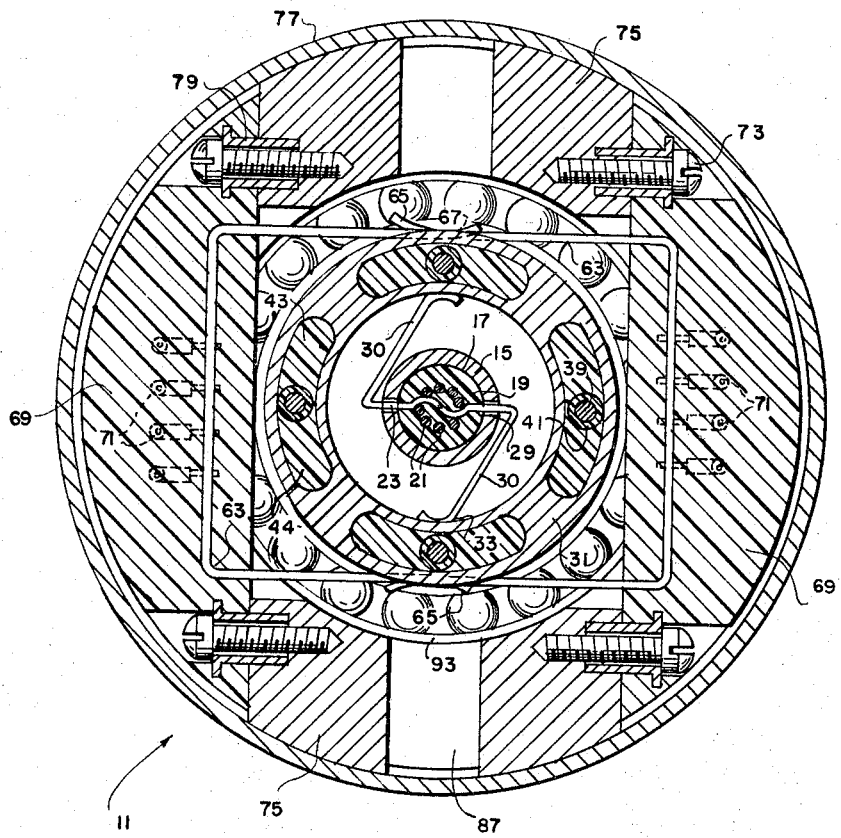

The inner feelers 23 (see FIGURE 3) project from the spindle 15 through slots 29. Opposite arm portions 30 of the feelers 23 are bent at acute angles in opposite directions toward axially aligned slip rings 31, and curved end portions 33 of the feelers engage V-grooves 35 in the inner surface of the respective slip rings. The feelers 23 for the individual slip rings 31, while shown in vertical alignment, may be staggered vertically, if desired.

The slip rings 31 are separated by insulating rings 37 and are held in aligned, coaxial relationship by rods 39 fitted with insulating tubes 41 and which extend through slots or holes 43 in the slip rings. The slots 43 may be filled around the rods 39 with an epoxy material 44. The upper ends of the rods 39 are rigidly fixed to an upper bearing housing 45, and the lower ends of the rods are similarly fixed to a lower bearing housing 47. The assembly comprising the slip rings 31, rods 39, upper bearing housing 45 and lower bearing housing 47 will hereafter be designated as a slip ring capsule 49.

The upper bearing housing 45 of the slip ring capsule 49 includes an annular flange 51 which together with an annular groove 53 in the spindle 15 forms a seat for antifriction bearings 55. The lower bearing housing 47 has an annular groove 57 therein which cooperates with annular groove 59 at the lower end of the spindle 15 to provide a seat for antifriction bearings 61.

U-shaped outer feelers or brushes 63 have opposite curved end portions 65 which fit, respectively, in V-grooves 67 formed in the outside surface of the slip rings 31. The feelers 63 extend alternately to respective slip rings from opposite sides of the slip ring capsule 49, and are molded into opposite insulation blocks 69, being connected within the insulation blocks to respective output lead wires 71. The insulation blocks 69 are secured by screws 73 (FIGURE 3) to mounting frame elements 75 which are fixed in any suitable manner to the inside surface of a slip ring external housing 77. Screw seats 79 are provided to insure correct placement of the outer feelers 63 with respect to their corresponding slip rings.

An annular bearing seat element 81 is fixed at the inside upper end of the slip ring external housing 77. The bearing seat element 81, which may be integral with the frame elements 75, is grooved at 83 opposite the flange 51 of the slip ring capsule 49, and antifriction bearings 85 fit between the flange 51 and the groove portion of the seat element 81. At the lower end of the slip ring external housing 77 is an annular bearing seat element 87 that may also be integral with the mounting frame elements 75. A groove 89 in the bearing seat element 87 together with a groove 91 in the lower bearing housing 47 of the slip ring capsule provides a seat for antifriction bearings 93. The antifriction bearings 61 and 93 are further secured by a bearing retainer ring 95 fixed to the slip ring capsule 49 by screws 97. A bearing retainer washer 99 is joined to the lower end of spindle 15 by a screw 101 to help stabilize the spindle 15 and inner feelers 23.

In the embodiment of the invention described herein the component of a guidance system of a rocket, for example, which would be rocking or oscillating along circular arcs with occasional full circle movements may be connected to the slip ring external housing 77 and is indicated generally in FIGURE 2 at 103. It is seen that the slip ring external housing 77 and the attached outer feelers 63 are rotatable around the slip ring capsule 49 through antifriction bearings 85 and 93. Moreover, the slip ring capsule 49 is free to rotate with respect to the outer feelers 63 and also with respect to the inner feelers 23, and latter rotation being afforded by antifriction bearings 55 and 61.

As explained previously, one of the principal novel and advantageous features of this invention is the provision of slip rings which may be continuously rotated so that a continuous and uniform scrubbing of the slip rings will occur over the entire contact surfaces thereof even though the component to which the feelers or brushes are attached is subject largely to rocking or oscillating motion with only infrequent full circle movements. One means of imparting continuous rotation to the slip ring capsule 49 will now be described.

Mounted on the upper bearing housing 45 of the slip ring capsule 49 by screws 105 is an internal spur ring gear 107. To impart rotation to the slip ring capsule 49 the spur gear 107 is driven by a motor 109 through a suitable gear train. The motor 109 is clamped on the cover plate 13 by a clamp element 111 and associated screws 113. A motor shaft 115 has one end portion thereof inserted in an axial bore formed in a worm gear 119. The shaft 115 may be keyed or otherwise fixed in the bore so that rotation of the shaft 115 will cause rotation of the worm gear 119. The gear 119 is carried by a spindle 121 that extends through two oppositely arranged antifriction bearings 123. The bearings 123 are fitted in a mounting block 125 which may be integral with or otherwise attached to the cover plate 13. The spindle 121 is retained in the bearings 123 by a C-ring 127.

A worm wheel 129, which meshes with and is driven by the worm gear 119, is joined to a spindle 131 (see FIGURE 2) that passes through two antifriction bearings 133 fitted in an opening 135 through the cover plate 13. The spindle 131 is stabilized by a C-ring 137, and carries at its lower end a spur pinion 139 that meshes with the gear 107 to transmit the motor drive to the slip ring capsule 49. The gear train described reduces the speed between the motor 109 and the slip ring capsule 49 to a few r.p.m. of the slip ring capsule. While an electric motor is shown as the power source for the capsule drive, other power sources may be used such as a hydraulic motor or an air driven turbine. Antifriction bearings throughout the drive system permits the use of a very low powered motor or other power source for driving the slip ring capsule.

It is apparent from the above description that the present invention provides a slip ring assembly wherein a continuous rotation of the slip rings occurs independently of rotational or oscillating action of input or output elements of the assembly. Thus the input and output feelers or brushes continuously scrub the contact surfaces of the slip rings resulting in a uniform wear and cleansing of the surfaces. This constant cleaning and uniform wear of the slip ring surfaces gives the slip ring assembly a capability of much longer and more satisfactory service.

Manifestly, the invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are intended to be embraced therein.

I claim:
1. A slip ring assembly comprising:
   (a) an electrical input means;
   (b) an electrical output means;
   (c) a slip ring rotatably mounted between said input means and said output means;
   (d) said input means being in electrical contact with said slip ring;
   (e) said output means having electrical contact means slidably engaging said slip ring;
   (f) means permitting said electrical output means to rotate relative to said slip ring;
   (g) means for rotating said slip ring independently of rotation of said output means;
   (h) said electrical output means comprising a feeler, said feeler having a resilient portion in contact with said slip ring.

2. A slip ring assembly as defined in claim 1 wherein said slip ring is retained between bearing housing elements, said bearing housing elements partially forming a seat for antifriction bearings.

3. A slip ring assembly as defined in claim 2 wherein said electrical output means is carried by a slip ring housing, said housing including bearing receiving elements which cooperate with said bearing housing elements to form seats for antifriction bearings and antifriction bearings being retained in said seats.

4. A slip ring assembly comprising:
   (a) a slip ring having inner and outer surfaces;
   (b) said slip ring being rotatably mounted in said assembly;
   (c) electrical conducting elements contacting and leading from said inner and outer surfaces of said slip ring;
   (d) one of said conducting elements being in slidable contact with one of said surfaces and being adapted for rotation while sliding over said one of said surfaces;
   (e) said slip ring being rotatable independent of rotation of said one of said conducting elements;
   (f) said one of said conducting elements being carried by a housing encircling said slip ring, said housing being adapted for oscillation and rotation about said slip ring.

5. A slip ring assembly comprising:
   (a) a spindle disposed substantially along an axis of said assembly;
   (b) electrical contact means carried by said spindle and extending laterally of said spindle;
   (c) a slip ring rotatably mounted in said assembly and encircling said spindle;
   (d) said electrical contact means contacting said slip ring;
   (e) a housing encircling said slip ring and adapted for rotation about said slip ring;
   (f) said housing bearing an electrical contact element being in slidable contact with said slip ring;
   (g) said slip ring being rotatable independently of said housing;
   (h) means for driving said slip ring in continuous rotation.

6. A slip ring assembly as defined in claim 5 wherein said spindle contains a lead wire disposed longitudinally of said spindle, said lead wire being connected within said spindle to said contact means carried by said spindle.

7. A slip ring assembly as defined in claim 5 including electrical insulation material mounted in said housing, a lead wire encased in said insulating material, said electrical contact element borne by said housing being connected to said lead wire within said insulating material.

8. A slip ring assembly comprising:
   (a) a spindle disposed substantially along an axis of said assembly;
   (b) a plurality of input feelers carried by said spindle and extending in a plane substantially perpendicular to the longitudinal axis of said spindle;
   (c) a slip ring capsule comprising a plurality of axially aligned slip rings with said slip rings presenting inner and outer circular surfaces;
   (d) said slip rings encircling said spindle with said input feelers being in slidable contact, respectively, with said inner surfaces of said slip rings;
   (e) a housing encircling said slip ring capsule and adapted for rotating about said slip ring capsule;
   (f) said housing bearing a plurality of output feelers;
   (g) said output feelers being in slidable contact, respectively, with said outer surfaces of said slip rings;
   (h) said slip ring capsule being rotatable independently of said spindle and said housing;
   (i) means for driving said capsule in continuous rotation whereby said input and output feelers continuously scrub the respective inner and outer surfaces of said slip rings.

References Cited

UNITED STATES PATENTS 2,669,483   2/1954   Fletcher.
2,766,625   10/1956  Swanson.
2,797,761   7/1957   Barish et al.

MARVIN A. CHAMPION, *Primary Examiner.*

RAYMOND S. STROBEL, *Assistant Examiner.*

UNITED STATES PATENT OFFICE
CERTIFICATE OF CORRECTION

Patent No. 3,375,479 March 26, 1968

Estel G. Lowe

It is certified that error appears in the above identified patent and that said Letters Patent are hereby corrected as shown below:

In the heading to the printed specification, lines 3 and 4, cancel "7803 Milton St., Huntsville, Ala. 35802" and insert -- Huntsville, Ala., assignor to the United States of America as represented by the Administrator of the National Aeronautics and Space Administration --.

Signed and sealed this 23rd day of September 1969.

(SEAL)
Attest:

Edward M. Fletcher, Jr.

Attesting Officer

WILLIAM E. SCHUYLER, JR.

Commissioner of Patents